US008792141B2

(12) United States Patent
Moore et al.

(10) Patent No.: US 8,792,141 B2
(45) Date of Patent: Jul. 29, 2014

(54) EMBEDDED FORM EXTRACTION DEFINITION TO ENABLE AUTOMATIC WORKFLOW CONFIGURATION

(75) Inventors: John A. Moore, Webster, NY (US); Francois Ragnet, Venon (FR)

(73) Assignee: Xerox Corporation, Norwalk, CT (US)

( * ) Notice: Subject to any disclaimer, the term of this patent is extended or adjusted under 35 U.S.C. 154(b) by 334 days.

(21) Appl. No.: 13/156,637

(22) Filed: Jun. 9, 2011

(65) Prior Publication Data
US 2012/0314954 A1    Dec. 13, 2012

(51) Int. Cl.
H04N 1/40 (2006.01)
G06F 17/00 (2006.01)
H04N 21/8358 (2011.01)
H04N 1/32 (2006.01)
G06Q 10/06 (2012.01)

(52) U.S. Cl.
CPC .... H04N 21/8358 (2013.01); *H04N 2201/3269* (2013.01); *G06Q 10/06* (2013.01); G06Q 10/06316 (2013.01); *H04N 2201/327* (2013.01); *H04N 1/32144* (2013.01)
USPC ........... 358/3.28; 358/1.1; 358/2.1; 358/1.13; 358/1.15; 715/221; 715/224; 715/243; 715/249

(58) Field of Classification Search
CPC .................................................. G06Q 10/06
See application file for complete search history.

(56) References Cited

U.S. PATENT DOCUMENTS

| | | | |
|---|---|---|---|
| 6,493,736 B1 * | 12/2002 | Forcier .......................... | 715/273 |
| 6,687,876 B1 * | 2/2004 | Schilit et al. .................. | 715/231 |
| 6,773,177 B2 * | 8/2004 | Denoue et al. ................. | 400/88 |
| 6,886,136 B1 * | 4/2005 | Zlotnick et al. ............... | 715/780 |
| 6,915,484 B1 * | 7/2005 | Ayers et al. ................... | 715/234 |
| 7,289,685 B1 * | 10/2007 | Wolff et al. ................... | 382/317 |
| 7,796,285 B2 * | 9/2010 | Robbins ....................... | 358/1.15 |
| 8,332,253 B1 * | 12/2012 | Farmer et al. ................ | 705/7.27 |
| 2004/0236951 A1 * | 11/2004 | Zhao ............................. | 713/179 |
| 2005/0057779 A1 * | 3/2005 | Sesek et al. ................... | 358/400 |
| 2006/0071915 A1 * | 4/2006 | Rehm ........................... | 345/173 |
| 2007/0214407 A1 * | 9/2007 | Bargeron et al. ............. | 715/512 |
| 2009/0251721 A1 * | 10/2009 | Knodt et al. ................. | 358/1.15 |
| 2010/0060909 A1 * | 3/2010 | Conescu et al. ............... | 358/1.9 |

FOREIGN PATENT DOCUMENTS

EP   2040165 A2 *  3/2009
WO   WO2012050570 A1 *  4/2012
WO   WO2012087270 A1 *  6/2012

* cited by examiner

*Primary Examiner* — Richard Zhu
(74) *Attorney, Agent, or Firm* — Fay Sharpe LLP

(57) ABSTRACT

A system and methods are disclosed to automatically extract data from documents, such as scanned paper forms and/or digital forms that need to be pre-configured to understand a layout for the forms to be processed. The system extracts data from the form definition at a two dimensional barcode and dynamically configures a workflow with services for extracting desired user filled information from the data fields present on the form. Support for a re-flowable service is provided.

17 Claims, 5 Drawing Sheets

FIG. 4

EMBEDDED FORM EXTRACTION DEFINITION TO ENABLE AUTOMATIC WORKFLOW CONFIGURATION

BACKGROUND

The present disclosure relates to fields of image and document processing. It finds particular application in connection with the processing of different kinds of documents by extracting data from the document to configure a workflow for other like or similarly created documents.

Form processing, in general, involves a process by which information is captured to be entered into data fields for conversion into an electronic format, which oftentimes is at a back office system, for example. Data is entered or captured from various data fields of the forms and the forms themselves are made digital to be saved as images. Afterwards, a hard copy of the data on the document can be scanned in as an image using a scanner. This image is then recognized based on a pre-defined configuration. The data is captured from particular zones and stored in an electronic format. Afterwards, the data is typically transmitted further down the processing chain to a business workflow that utilizes the data for making certain business decisions or other implementations according to the particular business model, such as a loan processing center for determining a loan approval or other business or client workflow purposes.

There are several common issues that are involved in forms processing and in processing documents overall. When performed manually, a tedious amount of effort is put into the task, the data keyed in by the user may result in typos, and many hours of labor result from this lengthy process. If the forms are processed using computer software driven applications, some issues can be resolved and minimized. Automatic form input systems, for example, use different types of recognition software. For example, optical character recognition (OCR) is the mechanical or electronic translation of scanned images of handwritten, typewritten or printed text into machine-encoded text, which is used, for example, to convert books and documents into electronic files, to computerize a record-keeping system in an office, or to publish the text on a website. Another example of recognition software is intelligent character recognition (ICR). ICR provides a handwriting recognition engine that allows fonts and different styles of handwriting to be learned by a computer during processing to improve accuracy and recognition levels. This system extends the usefulness of scanning devices for the purpose of document processing, from printed character recognition (a function of OCR) to hand-written matter recognition. With this system, hand-written data can be automatically populated into a back office system, thereby avoiding laborious manual keying and can be more accurate than traditional human data entry. Intelligent word recognition (IWR) is another example that recognizes and extracts printed-handwritten information and cursive handwriting as well.

Automated Forms Processing technology can employ these systems and others such as Optical Mark Recognition (OMR), which scans a document to detect the presence or absence of a mark in predetermined positions, such as with questionnaires or survey forms. However, manual configuration in processing documents and forms continues to be a large task that can be time intensive. In particular, when form documents need to be pre-configured and then populated with the user's data for processing, a large amount of time can be taken to defining many different form layouts for filling in the many different types of user data. A sample form is often needed as well to extract the layout before processing the data on a form accurately.

One approach that has been developed to alleviate some of the manual configuration needed, and improve data extraction accuracy, is to get the user to fill out an electronic version of the form on a computer while dynamically generating a two dimensional (2D) barcode on the form that contains the user-entered data associated with each field on the form. The form is still printed on paper (and typically signed) and then is scanned for processing. Rather than running OCR/ICR or like recognition software on the image, the associated forms processing system reads the 2D barcode that was dynamically added to the form before printing to extract the user data entered for each field.

Other practical issues, however, remain unresolved in the field of form processing. In particular, specific software is often needed on an end user's computer to provide the dynamic barcode generation, which may also require licensing fees associated with the software. Not all users have access to computer systems and devices for this purpose. In addition, limited information can be entered into a barcode, which often ends up being a pointer to a database. If the database is unavailable from the form generation application and/or the form scanning/processing application (e.g., with a firewall, or broken network link), then the link is broken from the database. Currently, the form information is extractable only if it is printed and some information may not be handled easily (e.g., signature and data information that a user adds to the form). Consequently, creating form documents that are filled in by a user and afterwards processing the document allows no, or very little separation between these two stages of form processing.

Accordingly, it is desirable to provide additional methods and systems that allow a greater separation between the creation and encoding of a document and a processing stage, which may be performed at a back office, by automatically configuring a pre-defined workflow for the form, its contents and information to easily further process similar-like forms and move them down a process chain to a different client designated workflow.

BRIEF DESCRIPTION

The following presents a simplified summary in order to provide a basic understanding of one or more aspects of the disclosure. This summary is not an extensive overview and is neither intended to identify key or critical elements, nor to delineate the scope thereof. Rather, the primary purpose of the summary is to present some concepts of the disclosure in a simplified form as a prelude to the more detailed description that is presented later.

Methods and systems are disclosed herein that enables a definition of a document processing workflow to automatically generate a workflow configuration for processing different types of documents according to the definition. A form may be any document type or image that has one or more data fields storing information that defines the document. The present disclosure is not limited to any one type of form or document and envisions any document format (e.g., .pdf, .doc, .docx files) as well as any printed form for processing. As a document or form is created, information within the data fields is encoded within a two dimensional barcode, watermark, graphical symbol or the like for scanning. A document or form is defined in the barcode according to the type of configuration information that makes up the form, such as zone locations, structural information, index fields or data fields storing information, image pre-processing, alignment anchors, types and rules for each field, output delivery setup and formatting services. This bundle of information is encoded into a two dimensional barcode or dynamic graphical symbol located at the document for scanning and is processed according to a workflow to process the form. Based on the configuration information of a document, a workflow is generated and defined that can also be encoded into the barcode, graphical symbol or the like. This workflow definition can be extracted to process the document according to the definition created, such as at a backend systems processor. The workflow defined is cached into the processing system and once the data is extracted from each form received, such as from the two dimension (2D) barcode, the definition recalls the workflow configured for the particular type of form having similar metadata. This enables a system to process various types of forms in large quantities with very little configuration expense having to be allotted at every batch.

The workflow configured by the system and methods herein is to enable processing of different types of forms/documents, which is different and distinguished from a workflow, such as a business or client workflow that addresses how the extracted data from the form/document is used in accordance with the particular business process (e.g., such as for opening a bank account, employee H.R. action request), which may also be referred to commonly as a document workflow in common language.

At the form or document creation stage, user information along with other form data or other configuration information related to the form structure is encoded into the barcode. User information or user entered data includes information that is added to complete the form or document, such as a signature, a comment written in a commend field/section of the form, or any other data filled in by a person. Form data includes the configuration information of the form, such as zoning, structural information and rules governing each. Zoning information, as termed herein, can include two-dimensional coordinate information that specifies a location of one or more data fields involving local and/or global anchors or points of location. Structural information of each document or form includes the index fields having names for each of the data fields, and/or includes descriptions of user data that is expected to be filled in at certain data fields, such as whether the data is alpha, numeric, and/or alpha-numeric, or other describing information pertaining to data fields, for example. Certain rules in which the form is presented can govern the information embedded in a barcode, graphical symbol or the like used for scanning. These rules, for example, may provide that certain information or structural information is first depending upon certain conditions. For example, if information is provided to demonstrate if a person is an immigrant or not, other information is therefore provided for elaboration, or skipped to different degrees entirely or partially. The term barcode encompasses any watermark, graphical symbol, or hieroglyph-like-structure herein, which may be embedded on a form in two dimensional printed structures or three dimensional holographic-like structures thereon.

Alignment anchors, as discussed herein, refer to position locations of data within a form. For example, a text string position may be specified in a document or extracted from a form that specifies that screen (or scale) position by default gets aligned with a top left corner, which is considered the anchor point of the text string. The alignment of the anchor point is also defined within particular data fields according to each form that is created.

In another aspect herein, a form processing system moves beyond the methods of recognition discussed for aiding in the capture of data in an electronic format, such as Optical Character Recognition (OCR) for machine print, Optical Mark Recognition (OMR) for check/mark sense boxes, Bar Code Recognition (BCR) for barcodes, and Intelligent Character Recognition (ICR) for hand print. Users are able to process documents from their scanned images into a computer readable format, such as ANSI, XML, CSV and the like. In certain exemplary aspects, recognition processes may be used in the workflow that is defined by the system. A complete life cycle of form processing starts from scanning of the document to the extraction of the data, and to setup of delivery into a back-end system with format servicing, such as for processing or generating formatted results through calculations and analysis. A form processing system is particularly valuable in processing hundreds or thousands of form images every day where different workflows need to be generated depending upon the different types of forms being received, such as hand-filled forms, type printed forms, and electronically submitted forms, for example.

In other aspects of the disclosure, an embedded form extraction definition is encoded in the document and used to enable automatic workflow configurations for processing various types of forms that have hand-filled data, such as with a pen or pencil, in addition to forms with user filled information that is typed (e.g., type print data), and additionally process forms that are submitted electronically being composed entirely of digital data. An exemplary forms processing computer system can include a processing workflow that is cached for these various types of forms in order to avoid pre-defining a workflow configuration. An example workflow may include, but is not limited to: 1. A batch of completed forms is scanned using a high-speed scanner once the forms are received. 2. Data fields may be recognized automatically using pre-requisites involved in image pre-processing via the barcode. 3. Some characters about which the system is uncertain are passed on to a human operator, where data is entered/confirmed and can afterward be dynamically configured into a two dimensional barcode, and various types of recognition engines may be further implemented for different sections of the form in order to determine types of information (e.g., structure, zoning, other formatting, and user filled) on the form. 4. The data is captured from particular zones and stored in an electronic format.

Some of the automatic definition of image pre-processing can include: scan format, which includes the format of a scanned file, resolution and DPI, color mode; configuration, such as the scanned image layout that needs to be configured for this automation; recognition, which involves the pre-defined output formats; and result/analyze, involving any specific format of result of captured data values presented and metadata associated with the form involving types and rules of configuration or the configuration information associated with the form. This configuration information associated involves the type of themes or definitions associated with a client workflow for setup of output delivery, for example, which can vary according to a particular business processing outsourcing system (BPOS) or downstream client workflow that further processes the particular forms in a different workflow than a configuration workflow, such as at a client workflow (e.g., a loan processing workflow, a credit processing workflow, or any other workflow purpose).

In another aspect of the present disclosure, the system is operable to provide two components. The first component, which is discussed above briefly, receives input configuration information from a mix of different types of forms, such as those filled in by hand, typewriter/type, or electronically without any special encoding software for providing a dynamic barcode information that changes according to the form and user information, as well as forms filled in electronically on a computer with special encoding software that embeds user input. An additional second workflow configuration component or workflow engine enhances form processing by generating a workflow that is configured to process the forms based upon a classification of the metadata extracted from the barcode, wherein the classification includes a degree of structure of the document as determined from the metadata extracted. The degrees of structure may be a highly structured document, a semi-structured document, and an unstructured document, where the document itself may be a mix of all three degrees of structure at various sections. The workflow engine thus reads the embedded configuration information accordingly, and dynamically builds or configures a particularized workflow with required services for processing the form based upon the classifications. A caching component then caches the workflow process in a memory to process the forms that have substantially similar field definitions extracted from the metadata in a two dimensional barcode for processing within the same batch or time period.

The following description and annexed drawings set forth in detail certain illustrative aspects and implementations of the invention. These are indicative of only a few of the various ways in which the principles of the invention may be employed.

BRIEF DESCRIPTION OF THE DRAWINGS

FIG. 4 is a representation of document forms for generating a workflow according to aspects of exemplary embodiments herein.

DETAILED DESCRIPTION

Figure 1:
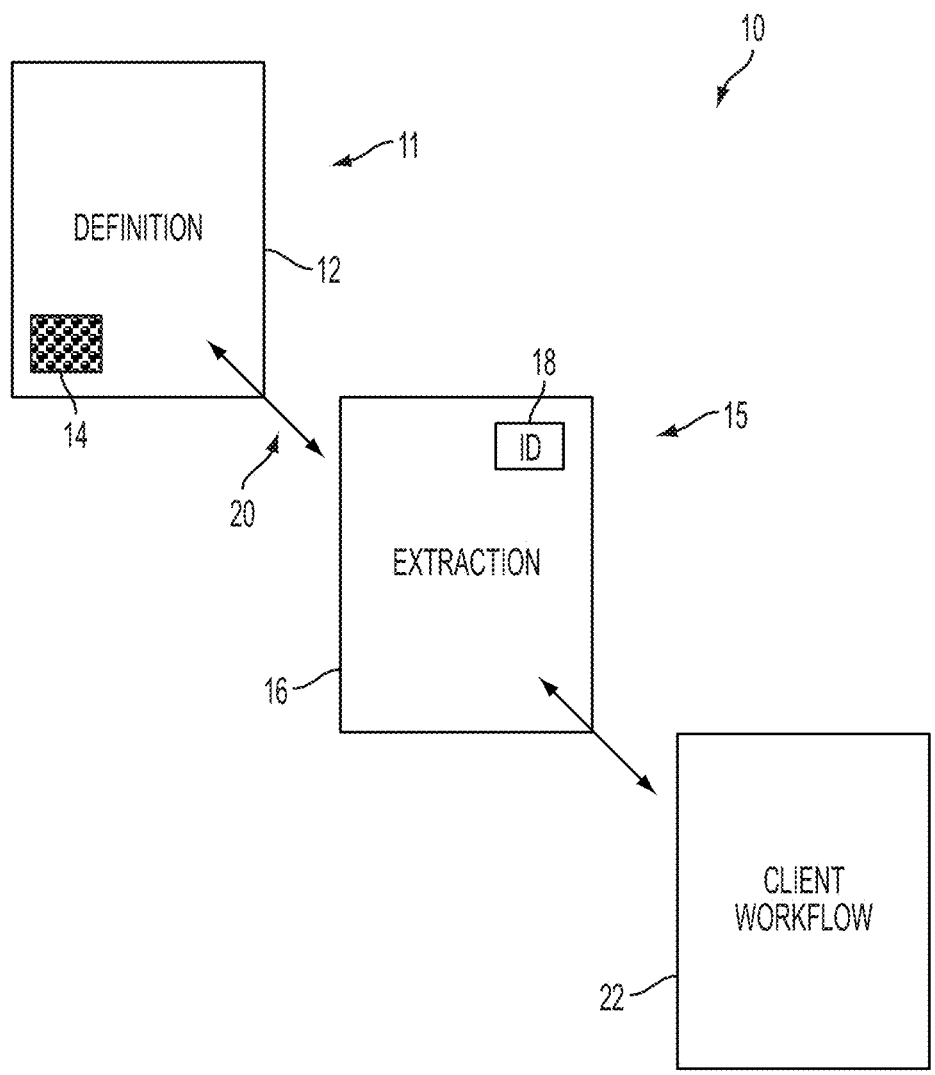
FIG. 1 is a functional block diagram of document processing according to aspects of exemplary embodiments herein.

One or more implementations of the present disclosure will now be described with reference to the attached drawings, wherein like reference numerals are used to refer to like elements throughout. Aspects of the exemplary embodiment relate to a system and methods for providing the ability to efficiently process forms in a form processing system that encodes information related to the form and generates a workflow for processing the form.

Referring now to FIG. 1, illustrated is a simplified form processing chain 10 that encompasses processing of a document. While forms may be referred to throughout this disclosure, any document that includes forms to be filled in or any paperwork that facilitates a business process with information that is extracted off the pages is envisioned by the present disclosure and intended to be part of the meaning of a form.

At an initial document definition stage 11, a form or document 12 (e.g., a bill, a form, a survey, or the like) is defined for receiving information thereon (e.g., user data or the like) and a 2D bar code 14 encodes those definitions, which may be used when further processing the document, such as with a bill having a bar code. The document 12 is further filled-in by a user with relevant data, which depends upon the type of business document being processed, such as a loan form, a bill to be paid, a magazine subscription form, etc. The document/form is then submitted or communicated via a communication service line 20, which may be mail, fax, electronically via email, text, etc. The document, which is now filled in and has definitions encoded within the 2D barcode 14, is processed at a second extraction stage 15 of processing at an extraction or processing system 16, such as a back office or backend processing department system, for example. Upon receiving the document form 12, the back end processing system 16 scans the barcode 14 and enters the information filled in, such as a number or amount paid that is filled in on the form, for example. The processing system 16 includes an identifier (ID) component 18 that extracts information (e.g., metadata) from the document to be processed accordingly. Ideally, once the form is scanned at the barcode 14 everything is known automatically, such as whose bill it is, who is getting paid and they would have automated extraction of that amount.

After extracting information related to the document form 12, the form and the metadata are transmitted to a client workflow 22, which will act according to any business processing model suitable, such as a loan processing center, bill pay department, approval process, and/or any business purposes for processing a document or form for related purposes.

In one embodiment, the communication link 20 includes multiple communication channels, such as by paper (e.g., by mail, fax etc.) where the form is edited online and printed or where the form is printed and filled in by pen or by hand. In addition, the communication link 20 may be purely electronic (e.g., by email or the like). These various communication means can vary the degree of complexity in analyzing a form. Each document may also have different classifications and corresponding degrees of complexity depending upon the business type or client workflow 22 that the form is configured for. For example, each form is configured in order to be processed at the extraction stage 15 where the system 16 and ID component 18 analyzes it either automatically or with people in front of screens keying in user filled information. For example, each document that is received at the extraction stage is configured in the system 16 for a user to operate with, such providing zooming to the right fields, displaying properly to the user, locating the data entry fields next to any necessary image that it needs to display, and the like for further processing based on the classification or complexity of input at the document 12.

In certain embodiments, the document 12 itself is defined in the barcode 14 at the create/define stage 11. The information or metadata is extracted out of the form at the extraction stage 15 and a workflow is configured automatically based on the information extracted from the document 12. The metadata includes configuration information with data fields having user information that are of interest to the particular business model related to the document, such as account numbers, signatures, validating items and the like, for example. The extraction can occur at a back end work flow system that would process the information and then to the client workflow 22 or business system that would provide processes such as routing, routing approval, and the like.

Figure 2:
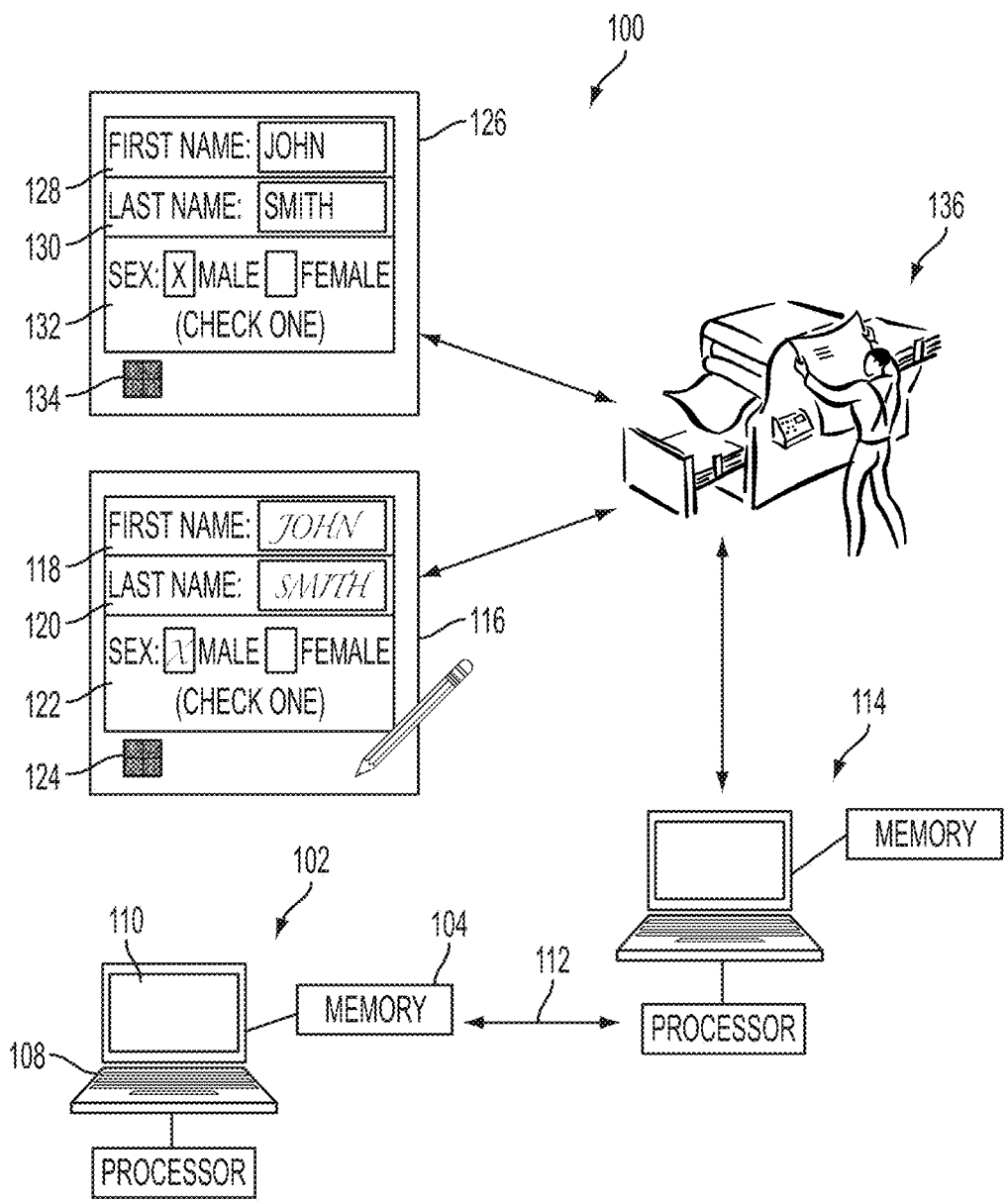
FIG. 2 is a diagram of document processing according to aspects of exemplary embodiments herein.

Referring to FIG. 2 illustrated is a document processing system 100 for creating an automatic workflow definition to process a document according to aspects of exemplary embodiments. The system 100 is adapted to receive various types of documents, configure a workflow definition for processing the various documents according to information extracted from the document (e.g., from a barcode), and further process similar additional documents with the workflow definition cached in the systems memory, such as at a back office or back end processing system 114.

The processing system 114, for example, is operable to receive a document or form that is submitted electronically from a client device. A client device or other end-user device, such as a computer device 102, which includes a memory 104 for storing instructions that are executed via a processor. The device 102 includes an input device 108 and a display 110 in addition to a user interface (not shown) and a network connection 112 that enables transmission of electronic data. Initially a document is created and then filled in by a user electronically or after being printed. Content of a document stored in the memory 104 may be displayed or rendered in the user interface and sent over the network 112 electronically to the document processing system 114 that configures a workflow for processing the particular document further along a system chain. Afterwards, the processing system 114 furthers the data extracted to a client workflow or a business process (not shown) that may route, approve, data share, or handle the data according to any business process procedure or client workflow purposes. For example, the document may be a form having user data fields that particular businesses process or client workflow may be interested in, such as account numbers, signatures, validating and the like.

The document processing system 114 is adapted to receive documents in various manners and according to different types of documents. For example, a form 116 is a printed paper form with various index fields with category names and check boxes that have been filled in by hand. A data field 118, for example, includes associated data (e.g., "First Name:") with structural information that identifies or describes the user information to be entered in the field. The data field 118 provides locations for entering the user data, such as a "First Name" of a user. The zoning and structural information of the form 116 is encoded in a barcode symbol 124 of the form 116. The form 116 further includes additional data field 120 and data field 122 having different information with user data, description data and location data therein and encoded within the symbol 124. Information on the form can be encoded into the symbol 124 and based upon the information provided in creating the form 116, the symbol 124 is altered for scanning and receiving the encoded information thereby.

The form 116 is different from a document that may submitted electronically via network connection 112 from the system 102, for example. The form 116 is printed and has been filled in with a writing utensil, such as a pen or pencil, as illustrated pictorially and with the cursive font of the user information filled in the location boxes of each field 118, 120 and 122.

A form 126 is further illustrated that includes type print information that has been filled in by a user within data fields 128, 130, and 132. The form information (e.g., structural information, zone information) and the user information (e.g., user pen filled data) can be encoded within a barcode or symbol 134. The information is not limited to the information provided in FIG. 2 at forms 116 and 118, and neither are the particular data fields illustrated for exemplary purposes. Multi-faceted types of various forms may be presented to the system 114 for processing and in different manners. For example, the forms 116 and 118 are not submitted electronically, but rather are printed at a printing assembly 136 or image processing system for producing printed images. Afterwards the forms 116 and 118 are received at the processing system 114 at which the forms are pre-configured and populated with user data according to metadata associated with each document, image or form received via paper and/or electronically. The workflow implemented for each type of form (e.g., digital, paper based with type and/or hand print data) is configured and cached for processing further forms of the same definition. In certain embodiments described in more detail below, the workflow configuration supports a re-flowable form, and thus, multiple classifications of data having different degrees of structure are also defined. A re-flowable section of a form is a data field that changes in size, location or type depending upon different kinds of user data provided at the zone of the data field, for example. In some cases, this can be print information, and in other cases this information is typed in by a user and the data field expands or narrows accordingly so that it can re-flow onto another page and enlarge on a current page by hiding other data fields that may be of a high structure and fixed.

Figure 3:
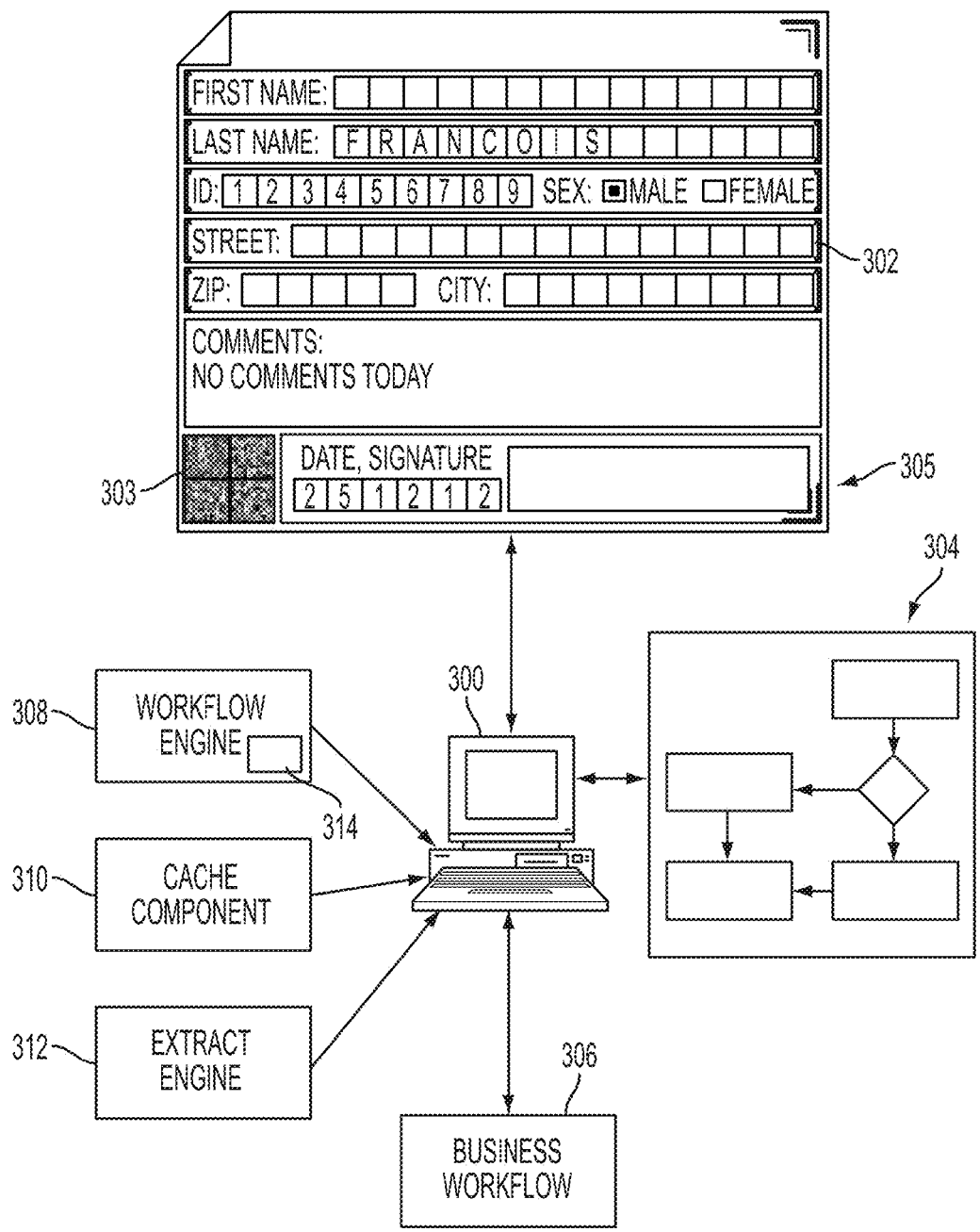
FIG. 3 is a is a diagram of a document processing system according to aspects of exemplary embodiments herein.

Referring now to FIG. 3, illustrated is an extraction system that generates a workflow for processing documents or forms having a two dimensional barcode. A system 300 receives a form 302 with user information filled in at various data fields. In the current example, the fields have been filled in by type (e.g., by keyboard), however, the fields may have been filled in by hand, such as with a pen or pencil, or be received electronically in a digital document format (e.g., .doc, .docx, .pdf and the like). Configuration information is encoded in the form by a specialized encoding component that encodes the form field definition information and embeds it on the document in a 2D barcode 303. The configuration information includes information such as a unique field name or identifier, a location of the field on the form, a field type (e.g., check box, text box and the like), expected data type of the field (e.g., date, number, dollar amount, and the like), association, if any, to other fields on the form, global anchor 305 and local anchor coordinates (e.g, global/local anchors, textual anchors, and the like), image pre-processing (e.g., color, drop, etc.) extraction type needed (e.g., ICR, OCR, OMR, etc.), content type (e.g., alpha, numeric, alphanumeric, dependencies between OMR check boxes and the like), and/or rules such as post-processing validation rules (e.g., data is MM/DD/YY after Sep. 13, 2010, or lookup needed (e.g., ID and name need to match).

The system 300 compliments the encoding component by reading the embedded configuration information and dynamically configuring a workflow with the needed services to process the form according to the configuration information extracted from the metadata. For example, the document 302 needs to be pre-configured and then populated with the user's data for processing, in which a large amount of time has typically been taken to defining many different form layouts for populating the many different types of user data. A workflow 304 configured by the workflow generation system 300 for this processing is generated automatically with a workflow engine 308.

The system 300 generates the workflow 304 for processing forms with the two dimensional barcode 303. The system has a processor with a memory for processing instructions therein. An extraction engine 312 extracts metadata associated with forms from the barcode 303 associated therewith, wherein the metadata includes configuration information having field definitions associated therewith. The workflow engine 308 generates a work flow to process the forms based upon a classification of the metadata extracted from the barcode. The classification includes a degree of structure for the document determined from the metadata, such as whether the form is filled in by hand, type, and/or submitted electronically. In addition, the services needed for each type of form can also add to the degree of complexity within each structured document, which, in turn, requires various resources to be accessed as part of the workflow 304 configured. Various service, for example, called into execution within workflows being generated can include the creation of index fields, automatic definition of image pre-processing and alignment anchors, configuration of extraction zones, types and rules for each field, support for a re-flowable printed document, and/or setup of output deliver and formatting services.

A caching component 310 caches the workflow 304 in the memory to process forms that have substantially similar configuration information and/or field definitions in the metadata extracted from the barcode. The workflow 304, for example, may be cached to process large batches of similar forms within a certain time period, or stored for further implementation on other similar forms, that are either similar in structure or for the same business workflow 306. For example, a look up table could have different workflows cached in the memory for processing forms that have substantially similar field definitions, wherein the forms include printed forms and electronic forms received by the processor.

Figure 4:
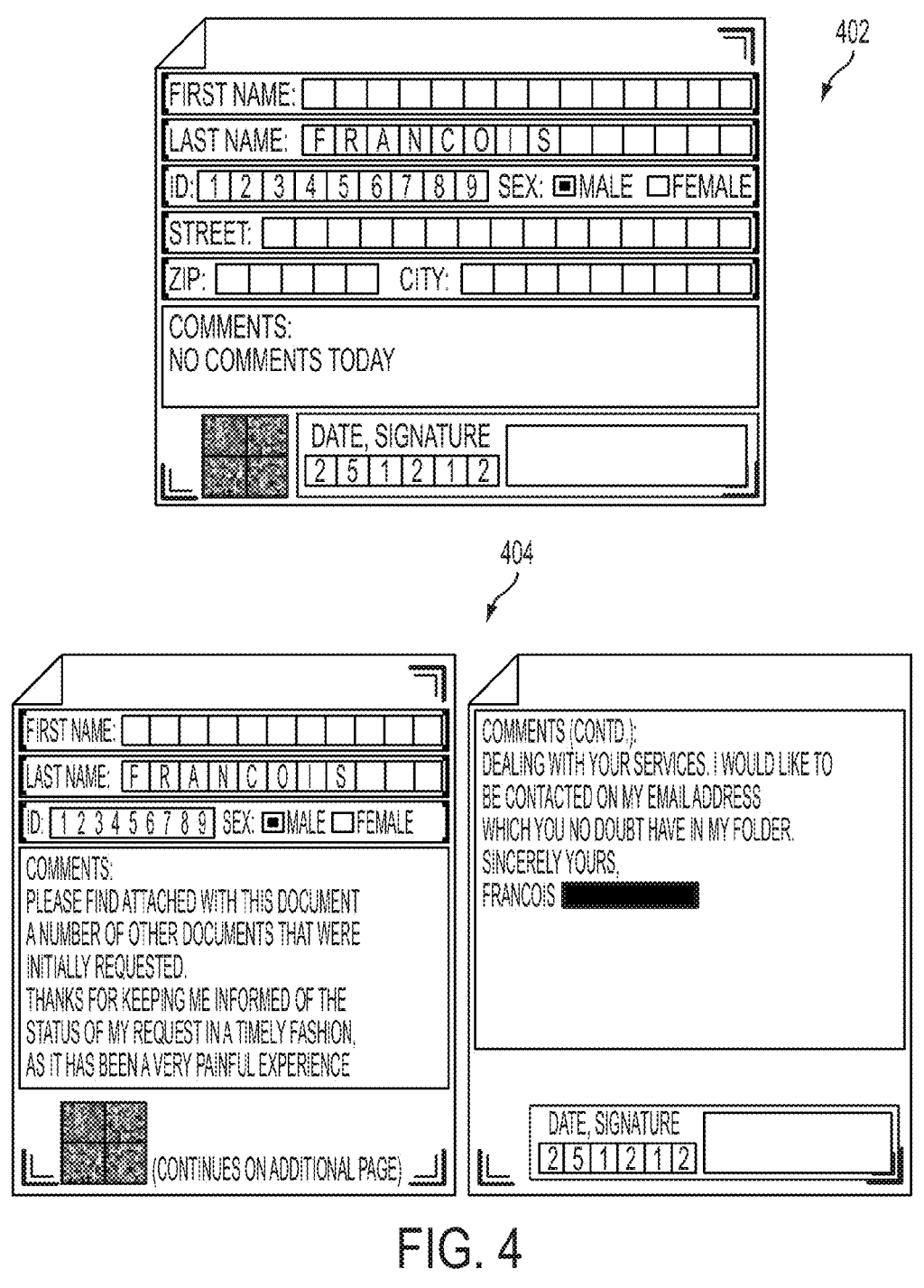

The system further includes a re-flow component 314 that supports forms that dynamically alter according to content within a data field of the form by altering global image anchors and local image anchors therein. FIG. 4 illustrates one example of the re-flowable component 314. The top form 402 provides a comment section below the local anchors designating "zip" and "city" information. The section is described as "Comments:" and allows a user to enter comments based on the nature of the form. This section is re-flowable, and therefore, dynamically connects and ascertains relationships between the global and local anchors. For example, a bottom form 404 illustrates where a user has filled in more information than in the top form 402 where a user has printed "NO COMMENTS TODAY." In contrast, the bottom form 402 illustrates where a user has filled in extensive information regarding a complaint and attached information with the document/form 404. The re-flow engine 314 has provided a different relationship between the global and local anchors so that in the bottom form 404, as compared to the top form 402, the comment section field now lies below a field for ID and sex information. The field designation zip and city are now hidden, as well as a section that indicated street information. This enables accommodation fields for extra information based on the relation between the global and local anchors of the document/form. In this manner, some paragraphs may be extended and/or skipped within a document by the re-flowable component, which may be housed in the workflow engine or separately housed, for example, and a vertical auto-synchronization of the extraction regions can occur.

Figure 5:
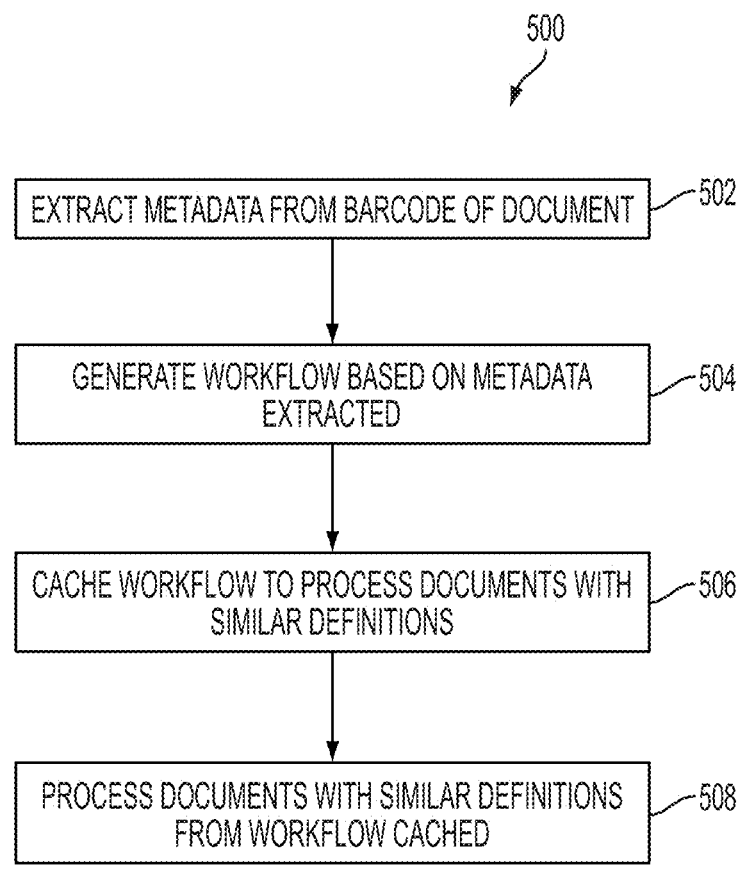
FIG. 5 is a flowchart detailing an exemplary method for dynamically generating an automatic workflow for a document.

An example methodology 500 for generating a workflow configuration for processing documents based on metadata extracted is illustrated in FIG. 5. While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At 502, metadata is extracted from a barcode of a document. When processing the document, configuration information is interpreted and the document is automatically pre-configured or setup. What would normally be a highly manual process of setting this system up to process a particular kind of document is made automatic with the information in the barcode. The metadata is identified by an identifier and described in order to auto set up a workflow to process that document. At 504, a workflow is generated based on the metadata extracted.

In one embodiment, a reflow engine provides an automatic re-flow into the documents received and although the document or form has the same type of configuration and from the system's perspective is the same type, the document/form may vary depending upon the individualized user information, especially in sections for comment filling or the like. For example, documents of the same class can allow for some customization by the user within that document. The re-flow capabilities of the system can be defined within the barcode and can be used to generate a workflow as a piece which reads that and sets the system up for auto processing.

At 506, workflow generated is cached in a memory and easily recalled when other documents/forms with similar definitions are also processed. This enables form configuration workflows to not have to be recreated each and every time. If a document came in with similar definition, the system could thus could easily search through a library and pick from one to enhance productivity and speed of the system.

At 508, documents or forms with similar definitions extracted are processed with the workflow cached. For example, depending upon the classification of the document a workflow can be retrieved with a look up table or the like, such as with structure documents, semi-structured documents and unstructured documents. A structured document would be a type of a document that does not change when a user fills it out, and thus, the definition of that document does not significantly change. Alternatively, the form could change to different degrees of complexity depending upon the amount of fields that are re-flowable and allow for customization in the structure.

An advantage is that the process configures the workflow based on the information extracted from the barcode without any other prior knowledge of the form or document. This saves time from the manual steps or setting up of fields, locations, what types and rules govern the fields with global and local anchors for each particular type of form.

In certain embodiments, the workflow that is configured can be updated and re-configured in order to accommodate varying degree of documents/forms. Rather than processing a form according to one way, the system can be updated in order to process a form in another way. For example, if a new method of processing forms occurs, the system may be updated to incorporate the methods within the workflow configured automatically.

The methods illustrated herein may be implemented in a computer program product that may be executed on a computer or on a mobile phone in particular. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 7 can be used to implement the method for displaying and manipulating virtual renderings or scenes.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for a generating a workflow configuration for processing a document executed via a processor of a computer system with a memory that stores executable instructions having the method, comprising:
   receiving the document with user input filled within data fields;
   extracting form data including rules and zoning information associated with the documents from metadata contained in a barcode on the document;
   dynamically generating a workflow to process the document using the form data, the generating including:
      using the zoning information, determining a location of each data field within the document,
      in response to the user-input in a select data field meeting a condition defined in a rule, performing one of expanding and skipping a processing of a same or different data field based on the rule,
      for the select data field being expanded, dynamically connecting and ascertaining relationships between global and local anchors at the location of the select data field to accommodate additional user-information,
      extracting the user input from at least the data fields not associated with the skipping, and
      routing the extracted user-input based on the workflow; and,
   caching the workflows in the memory to process documents that have substantially similar field definitions in the metadata extracted from the barcode.

2. The method of claim 1, further comprising:
   processing an additional document with the workflow cached based on whether the document has definitions according to handwritten data, type print data, digital data for the data fields encoded in the barcode.

3. The method of claim 1, wherein generating workflows based upon the metadata extracted from the barcode includes:
   determining the user input within the data fields of the document; and
   extracting field definition information with the user input from a configured barcode.

4. The method of claim 3, wherein generating workflows further includes:
   upon analyzing the field definitions of the configuration information in the metadata extracted, determining what the data fields in the document are processed with an intelligent character recognition (ICR) engine and/or an optical character recognition engine (OCR) engine and determining what the data fields are operator processed.

5. The method of claim 1, wherein the extracting the metadata from the barcode includes extracting configuration information embedded in the barcode comprising a two dimensional barcode and processing the document based on the configuration information.

6. The method of claim 5, wherein the configuration information further includes the field definitions for document pre-processing, the data fields and alignment anchors that are extracted from the barcode.

7. The method of claim 6, wherein the configuration information extracted further includes configuration of extraction zones, types and the rules for the data fields associated with the document.

8. A method for generating a workflow configuration for processing forms with a two dimensional barcode executed via a processor of a computer system with a memory that stores executable instructions having the method, comprising:
   receiving a document with user input filled within data fields;
   extracting form data including rules and zoning information associated with the document from metadata contained in a barcode on the document; and,
   dynamically generating a workflow to process the document using the form data, the generating including:
      using the zoning information, determining a location of each data field within the document,
      in response to the user-information in a select data field meeting a condition defined in a rule, performing one of expanding and skipping a processing of a same or different data field based on the rule,
      for a data field being expanded, dynamically connecting and ascertaining relationships between global and local anchors at the location of the data field, and
      extracting the user input from the expanded data field; and,
   routing the extracted user input based on the workflow.

9. The method of claim 8, wherein the form data further includes structural information including degree of structure based on field definitions for the data fields, wherein a data field defined as a static field does not change among other similar forms and the data field defined as a dynamic field varies among similar forms.

10. The method of claim 9, wherein the dynamically connecting and ascertaining relationships between global and local anchors includes:
    providing a variable relationship between a global image anchor and a local image anchor, wherein the local image anchor includes a fixed anchor and the global image anchor changes based on content filled therein.

11. The method of claim 10, wherein providing the variable relationship between the global image anchor and local image anchor includes hiding local image anchors according to an amount of content within the global image anchor.

12. The method of claim 8, further comprising:
    setting up an output delivery document having a barcode with embedded user input therein to be extracted by a client workflow.

13. The method of claim 8, wherein the configuring the workflow comprises:
    processing the documents based on the field definitions embedded in the barcode that indicate whether user information is embedded in the barcode;
    upon determining that no user information is embedded in the barcode, providing recognition algorithms to identify user information or signal an operator;
    wherein generating the workflow includes configuring the workflow to provide services for processing the document that include creation of index fields, the definitions for pre-processing and alignment anchors, extraction zones, types and rules for each field, support for re-flowable printed documents, and setup of output delivery and formatting services.

14. A computer system that generates a workflow for processing forms with a two dimensional barcode having a processor with a memory, comprising:

an extraction engine that, after receiving a document with user input filled within data fields, extracts form data including rules and zoning information associated with the document from metadata contained in a barcode on the document;

a workflow engine that dynamically generates a workflow to process the document using the form data, the workflow engine configured to:

using the zoning information, determine a location of each data field within the document, in response to the user-information in a select data field meeting a condition defined in a rule, perform one of expanding and skipping a processing of a same or different data field based on the rule, for the select data field being expanded, dynamically connect and ascertain relationships between global and local anchors at the location of the select data field to accommodate additional user-information, and route the user input extracted from at least the data fields not associated with the skipping based on the workflow; and a caching component that caches the workflow in the memory to process forms that have substantially similar field definitions in the metadata extracted from the barcode within a certain time period.

15. The system of claim 14, further comprising:

a look up table having different workflows cached in the memory for processing forms that have substantially similar field definitions, wherein the forms include printed forms and electronic forms received by the processor.

16. The system of claim 14, further comprising:

an intelligent character recognition (ICR) engine that recognizes hand written fields;

an optical character recognition engine (OCR) engine that recognizes type print fields; and a dynamic barcode generator that configures a barcode for a processed form based on configuration information and user data entered into the data fields of the form.

17. The system of claim 14, further comprising:

a re-flow component that supports forms that dynamically alter according to content within a data field of the form by altering global image anchors and local image anchors therein.

* * * * *